(12) United States Patent
Mitariten et al.

(10) Patent No.: US 9,039,807 B2
(45) Date of Patent: May 26, 2015

(54) REGENERATIVE ADSORPTION PROCESS FOR REMOVAL OF SILICON-CONTAINING CONTAMINANTS FROM PROCESS GAS USING A NEUTRAL ADSORBENT MEDIA

(71) Applicant: Guild Associates, Inc., Dublin, OH (US)

(72) Inventors: Michael J. Mitariten, Pittstown, NJ (US); Roy Brown, Dublin, OH (US); Wayne Ballantyne, Columbus, OH (US); Joseph Rossin, Columbus, OH (US); Michael Knapke, Columbus, OH (US)

(73) Assignee: Guild Associates, Dublin, OH (US)

( * ) Notice: Subject to any disclaimer, the term of this patent is extended or adjusted under 35 U.S.C. 154(b) by 129 days.

(21) Appl. No.: 13/920,161

(22) Filed: Jun. 18, 2013

(65) Prior Publication Data

US 2014/0366726 A1    Dec. 18, 2014

(51) Int. Cl.
*B01D 53/04* (2006.01)

(52) U.S. Cl.
CPC ............ *B01D 53/04* (2013.01); *B01D 2258/05* (2013.01); *B01D 2253/30* (2013.01); *B01D 2257/55* (2013.01); *B01D 53/0462* (2013.01); *B01D 2256/245* (2013.01)

(58) Field of Classification Search
CPC .............. B01D 53/04; B01D 53/0462; B01D 2253/102; B01D 2253/104; B01D 2253/30; B01D 2256/245; B01D 2257/55; B01D 2258/05
USPC .............. 95/90, 114, 115, 116, 148; 423/210; 585/820
See application file for complete search history.

(56) References Cited

U.S. PATENT DOCUMENTS

| | | | |
|---|---|---|---|
| 5,899,187 A | 5/1999 | Gruber et al. | |
| 7,025,803 B2 | 4/2006 | Wascheck et al. | |
| 7,306,652 B2 | 12/2007 | Higgins | |
| 7,393,381 B2 | 7/2008 | Tower et al. | |
| 2007/0068386 A1 | 3/2007 | Mitariten | |
| 2008/0179177 A1* | 7/2008 | Cha | 204/157.43 |
| 2012/0024157 A1* | 2/2012 | Maheshwary et al. | 96/133 |
| 2013/0060074 A1* | 3/2013 | Pierce | 585/802 |
| 2013/0137567 A1* | 5/2013 | Stasko | 502/5 |
| 2013/0209338 A1* | 8/2013 | Prasad et al. | 423/219 |
| 2014/0171304 A1* | 6/2014 | Herrera et al. | 502/401 |

OTHER PUBLICATIONS

Finocchio et al. "Purification of Biogases from Siloxanes by Adsorption: On the Regenerability of Activated Carbon Sorbents", (Jul. 2009), Energy & Fuels 23, 4156-4159.*

Rene Huppmann, et al. "Cyclic siloxanes in the biological waste water treatment process-Determination, quantification and possibilities of elimination", Fresenius Journal of Analytical Chemistry (1996) 354: p. 66-71.

* cited by examiner

*Primary Examiner* — Frank Lawrence
(74) *Attorney, Agent, or Firm* — Fishman & Associates, LLC

(57) ABSTRACT

A natural gas-containing stream such as biogas from landfills and sewage treatment plants is freed of siloxane contaminants by passing the biogas through a bed containing an adsorbent having a neutral surface, which adsorbs the siloxanes. When the bed of neutral adsorbent is filled to capacity, the adsorbent bed is heated to remove the siloxanes and regenerate the bed. The neutral adsorbent reduces disadvantageous reactions between the adsorbent and siloxane and other impurities in the natural gas-containing stream.

20 Claims, No Drawings

REGENERATIVE ADSORPTION PROCESS FOR REMOVAL OF SILICON-CONTAINING CONTAMINANTS FROM PROCESS GAS USING A NEUTRAL ADSORBENT MEDIA

FIELD OF THE INVENTION

The present invention relates to processes for removing silicon-containing contaminants from natural gas-containing streams. In particular, the present invention relates to processes for removing siloxanes from biogases released from landfills and sewage treatment plants.

BACKGROUND OF THE INVENTION

Landfills and sewage treatment plants contain siloxanes from many sources.

One source is the semiconductor industry, which produces siloxanes as by-products of reactions involving silicon compound gases. Because siloxanes have detrimental effects on semiconductor products, siloxanes are removed from semiconductor process gases by processes such as adsorption onto diatomaceous earth, silica gel, molecular sieves and activated alumina, which eventually find their way into landfills.

Siloxanes are widely used in detergents as anti-foaming agents, preservatives for concrete and in the personal care industry in products such as deodorants, tooth-pastes, skin care preparations, hair conditioners and anti-perspirants.

The cleaning industry finds many applications for siloxanes. In dry cleaning, siloxanes are used as a more environmentally friendly solvent than traditional chlorofluorocarbons. In the electronics industry, siloxanes are used to clean circuitry.

Siloxanes refer to a class of organosilicon compounds with Si—O—Si linkage. Siloxanes are both cyclic and linear. Cyclic siloxanes have the general formula $(R_2SiO)_n$ where n equals 3 or greater and R represents an organic ligomer such as for example H or $CH_3$. Linear siloxanes have the formula $R_3$—Si—$(OSiR_2)_n$—O—$SiR_3$ where n equals 0 or greater and R represents an organic ligomer such as for example H or $CH_3$. Examples of cyclic and linear siloxanes and their designations are listed in the Table below.

| Cyclic siloxanes | Linear siloxanes |
| --- | --- |
| D3: hexamethylcyclotrisiloxane | MM: hexamethyldisiloxane |
| D4: octamethylcyclotetrasiloxane | MDM: octamethyltrisiloxane |
| D5: decamethylcyclopentasiloxane | MD2M: decamethyltetrasiloxane |

Siloxane-containing waste from industrial and domestic sources such as described above is discharged into landfill sites and sewage treatment plants, along with a variety of biological organic matter.

The organic matter in the waste decomposes to produce biogas containing various volatile organic compounds, such as methane. The biogas can be used to fuel various combustion engines. However, the biogas from landfill sites and sewage treatment plants is contaminated with siloxanes. The siloxane levels in biogas have been growing due to the increased use thereof in numerous products as discussed above. When an engine burns siloxane-contaminated biogas, the siloxane decomposes to form fine silicon dioxide powder. The silicon dioxide powder is deposited on engine parts such as turbine blades, cylinders and heat exchangers. The deposits increase the abrasion of engine surfaces, leading to a loss of engine efficiency and premature engine failure.

Further, as regulations controlling $NO_x$ emissions from point-sources become more restrictive, catalytic processes, such as for example selective catalytic reduction, are required to further reduce $NO_x$ emissions from engines. These catalysts are readily fouled by the silicon dioxide powder. Such fouling will require that siloxane levels be substantially reduced to low levels, e.g. less than 0.5 ppm, preferably less than 0.05 ppm, and more preferably less than 0.005 ppm.

Various methods have been proposed to remove siloxanes from the biogas streams. Adsorption-based systems are the most common. These systems utilize either a single-pass non-regenerated adsorbent bed or regenerable temperature swing adsorption (TSA) or pressure swing adsorption (PSA) systems, or a hybrid of the two systems. In the absence of moisture, siloxanes are readily adsorbed onto traditional adsorbents, examples of which include, but are not limited to, aluminas, silicas, activated carbons, zeolites and clays. However, at elevated humidity, water dominates the adsorbed phase, resulting in an excessive volume of adsorbent being required for effective siloxane removal. What is more, the presence of other species in the process stream, such as volatile organic compounds (VOC's) and $H_2S$, are also adsorbed by the media and, thus, compete with the siloxanes, further degrading adsorption performance.

Single-pass, non-regenerable adsorption systems are less complex than the regenerable systems, utilizing one or more adsorbent beds through which the biogas is passed. When the adsorbent becomes loaded to its capacity with siloxane, the adsorbent is removed from the system and replaced with fresh adsorbent. These single-pass systems typically use a carbon-based adsorbent, which require frequent change-out due to interference from $H_2O$ and $H_2S$, which limit siloxane loading capacity to typically less than 0.05 g siloxane per g carbon. The single-pass, non-regenerable systems have operating costs proportional to the amount of siloxanes in the process stream. For process streams containing high siloxane concentrations, the beds require frequent changeout and replacement, which can be expensive and which restricts the application of these systems to all but the low-siloxane level streams. Additionally, these systems require pretreatment to remove some of the moisture from the process stream, which would otherwise contaminate the adsorbent and considerably shorten adsorbent life.

Regenerable systems using activated alumina, activated alumina plus silica and activated carbon adsorbents to capture the siloxanes have been reported. After the adsorbent is saturated with siloxane impurities, the adsorbed siloxanes are removed in-situ using PSA or TSA to enable the bed to be reused. In the PSA system, the process gas is compressed and passed through one or more of the adsorbent beds where the siloxanes are adsorbed. After the bed is saturated with siloxane, the pressure on the bed is reduced to desorb the siloxanes, which are directed to a waste stream, which is commonly flared along with some of the process gas. PSA systems are effective at removing siloxanes to very low levels but suffer from comparatively high operating costs and lower methane recoveries than TSA units.

In the TSA system, the siloxanes are adsorbed followed by regeneration by heating of the bed. An example of a thermal swing adsorption unit for siloxane removal is disclosed in U.S. Pat. No. 7,306,652, where alumina or alumina plus silica are used to adsorb siloxanes. The saturated adsorbent is regenerated by passing hot air, or biogas at nominally 250° F. through the bed. The hot regeneration gas desorbs the siloxanes, which are then directed to a flare. The regeneration stream can include a slip stream of product gas or external streams used to heat and purge the bed. After heating, the bed is typically cooled, fully or in part, before being placed back on adsorption. Feed and regeneration flow direction are typically in opposite directions though design variations do not require it. The TSA systems are slightly less expensive to operate than the PSA systems, have higher methane recoveries but require pretreatment to remove moisture and other contaminants, such as H₂S, in the biogas. The pretreatment steps add additional complexity and increase the operating cost to about that of the PSA system.

One solution to minimize competing water adsorption is to employ hydrophobic adsorbents, such as zeolites, e.g. ZSM-5, zeolite beta and dealuminate zeolite Y. Although effective at minimizing water adsorption at high relative humidity values, hydrophobic zeolites are expensive. Another solution is to employ layered beds. In the layered bed configuration, the inlet layer contains a hydrophilic adsorbent designed to remove water. Examples of hydrophilic adsorbents include zeolite X, aluminum oxide, clays, etc. The outlet layer contains media that targets the removal of siloxanes. The theory of operation is that water is removed up-stream, allowing for the removal of siloxanes from a dry process stream. This solution is not without shortcomings. First, the overall bed size is inordinately large, due to the additional volume required to remove water, leading to increased capital and operating costs. Second, the bed will likely require more frequent regeneration and, due to the increased size, will be more difficult to regenerate.

A typical biogas stream may contain up to and in excess of 50 ppm total siloxane. In addition to the siloxane, the biogas stream will typically be saturated with water vapor, and may contain less than 1% non-methane VOC's plus up to 1,000 ppm of sulfur compounds that include mercaptans, thiols and H₂S. The concentration of H₂S may be up to and in excess of 500 ppm.

In TSA systems it is sometimes preferred to use the highest temperature possible for both the adsorption operation and desorption operation. Operating the adsorption step at an elevated temperature will reduce the relative humidity and thus the amount of adsorbed water within the pores of the adsorbent. However, operation of the adsorption process at an excessive temperature will decrease the adsorption capacity for the target contaminant. Further, should the contaminant be reactive, it could degrade or react otherwise within the pores of the media, reducing the ability of the media to be regenerated. Conducting the desorption operation at the highest possible temperature will facilitate desorption and reduce the time for desorption and regeneration, thus, increasing process efficiency. When selecting the "highest possible temperature" to conduct the desorption operation, factors including the thermal stability of the media and chemical reactions related to the adsorbed species must be taken into account.

Unfortunately, siloxanes are reactive. Siloxanes are known to undergo both acid and base catalyzed polymerization reactions. In the case of D4 siloxane, while not wishing to be bound by any particular theory, the reaction is expected to proceed as follows:

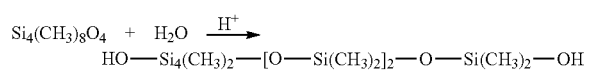

The hydrolysis product further reacts with the siloxane to yield the polymerized product:

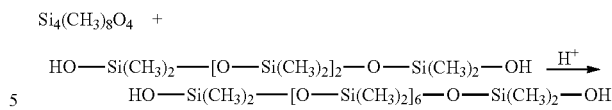

Polymerization of siloxanes will result in the corresponding products being accumulated within the adsorbent pores, thereby reducing adsorbent capacity, as well as the life-time of the adsorbent, leading to frequent change-out and disposal costs being incurred. Elevated desorption temperatures can also increase the polymerization reaction rates, further promoting accumulation of adsorbed species in the pores. As a result of these reactions, adsorption, desorption (or regeneration) temperatures remain relatively low to avoid the undesirable polymerization reactions.

Many commercial adsorbents are prepared with acidic or basic surfaces. For example, during the activation process, functional groups are formed on the surface of carbon. Examples of functional groups associated with the surface of activated carbon include hydroxides, carboxylic acids, ethers and carbonyls. Depending on the method of activation, the carbon is typically acidic or basic. Activation procedures associated with coal and coconut-based carbons typically yield basic media. Activation procedures associated with wood-based carbons typically yield acidic media. The use of commercial adsorbents with acidic or basic surfaces will have the potential to facilitate unwanted siloxane polymerization reactions during TSA processing.

SUMMARY OF THE INVENTION

The present invention relates to a process for removing silicone-containing compounds, such as for example siloxanes, from process streams, such as for example from biogas emitted from landfills and sewage treatment plants. According to the process described herein, the biogas is passed through a bed containing adsorbents. Vapor phase siloxane contaminants in the biogas are adsorbed within the pores of the adsorbent. When the adsorbent become saturated with siloxanes, the adsorbent is regenerated by heating the adsorbent in the presence of flowing regeneration gas to remove the adsorbed siloxanes. In systems containing two or more beds of adsorbent, one bed can be used to remove siloxanes from biogas while one or more of the other beds are being regenerated.

A useful aspect of the invention described herein is employing an adsorbent with a neutral surface. Biogas often contains elevated levels of sulfur gases, in particular H₂S. H₂S will interact with acidic or basic adsorbent surfaces to yield either elemental sulfur and/or sulfur dioxide, with sulfur dioxide being further oxidized to SO₃, which will accumulate on the adsorbent as H₂SO₄ via water interactions. In addition, siloxanes are known to undergo both acid and base-catalyzed polymerization reactions. Siloxane polymerization degrades the capacity of the sorbent, greatly reducing its useful life as a result of physically blocking the pores. The neutral-surface adsorbent avoids these disadvantageous reactions and allows the use of higher desorption temperatures to decrease regeneration times and increase TSA efficiencies.

DETAILED DESCRIPTION OF THE INVENTION

The present invention relates to a process for the removal of siloxanes from contaminated process streams such as for example landfill gas, digester gas, and waste water treatment gas, using a TSA process which incorporates an adsorbent with a neutral or neutralized surface. The neutral surface of the adsorbent is necessary in order to minimize polymerization reactions related to siloxanes, as well as minimize adsorption of water and minimize reactions associated with $H_2S$ and other sulfur-containing compounds, thereby allowing for an extended sorbent life. In its simplest form, the process steam enters an adsorbent bed whereby the adsorbent media possesses a neutral surface. In the case of biogas, siloxanes, water, $H_2S$ and other contaminants are adsorbed within the pores of the media, while methane passes through the bed. Once the bed becomes saturated with siloxanes to the point where appreciable levels of siloxanes are present in the effluent stream, the bed is regenerated by heating the bed to an elevated temperature with purge gas for a prescribed period of time such as to remove an appreciable amount of adsorbed siloxanes, thereby regenerating the adsorbent. A number of gases can be used as purge gas. For example, ambient air, clean dry air, nitrogen, methane, feed or purified product gas, or mixtures thereof, may be used to regenerate the bed following contamination with siloxanes. Once the bed is regenerated, the bed is cooled to or near the target temperature, and is then brought back on-line for adsorption.

Preferably, the siloxane-containing feed gas is heated to a temperature sufficient to reduce the relative humidity (RH) of the incoming process gas to less than about 50%. For example, if the incoming siloxane-containing laden feed gas is at 80° F., saturated with water, heating the stream to 105° F. or greater will be more than sufficient to reduce the RH of the feed gas to less than 50%.

The novel process described herein is particularly useful for the removal of siloxanes from biogas. The term "biogas" as used herein refers to a gas produced by the decomposition of organic matter. As used herein, a "biogas" can be obtained from a landfill, digester, or a sewage treatment plant, for example. If necessary, a pump can be used to extract and move biogas from its source.

A key aspect of the present invention is relating to an adsorbent with a neutral surface. For the purpose of this invention, a neutral surface is defined as a surface with a minimal amount of functional groups such as acid or basic sites, capable of facilitating undesired polymerization reactions related to siloxanes. The purpose of the regeneration step associated with the TSA process is to return the adsorption capacity of the media to at or near its initial value. Accumulation of matter within the pores of the adsorbent media will reduce the pore volume and hence the effectiveness of the adsorbent media. As is known to one skilled in the art, polymerization of siloxanes will yield products with greater boiling points that will be more difficult to remove from the adsorbent media during regeneration. Should polymerization reactions involving siloxanes be significant, a large fraction of polymerization products will accumulate within the pores of the adsorbent media. As a result, the pore volume of the adsorbent media will decrease, rapidly rendering the adsorbent ineffective and thus necessitating replacement.

A simple test for surface neutrality of an adsorbent surface involves slurrying the adsorbent media in water and monitoring the pH of the resulting slurry. If the pH of the slurry is between about 5.0 and about 9.0, preferably between 6 and 8, the surface of the media is deemed to be neutral. As noted above, during the activation of carbon sorbents, functional groups are formed on the surface of carbon. In the following description, the term "neutral adsorbent" means an adsorbent with a neutral or neutralized surface.

An additional test for surface neutrality involves contacting the adsorbent media directly with liquid siloxanes, allowing the siloxanes-laden media to stand for a specified period of time at or near room temperature. Following a discrete period of time, the adsorbent media is contacted with solvent, such as for example methanol, for the purpose of extracting any unreacted siloxanes from the pores of the sorbent. The solvent is then analyzed using techniques known to one skilled in the art, such as, for example, gas chromatography, for the amount of siloxanes. The percent conversion of siloxanes is determined by subtracting from 100% the amount of siloxanes in solution divided by the amount of siloxanes added to the adsorbent media, times 100%. Should the conversion of siloxanes be less than about 10%, the media may be considered to have a neutral surface.

Acidic or basic media can be neutralized using techniques known to one skilled in the art. For example, acidic or basic media can be washed continuously with DI water until the acid or basic sites are removed from the surface. This is indicated by the pH of the wash water being neutral. Alternatively, acidic media may be neutralized by washing with dilute caustic solution, while basic media may be neutralized by washing with dilute acidic solutions.

Neutral adsorbent materials are less affected by moisture and other contaminants in the biogas. As such, the adsorbents can achieve higher siloxane loadings than conventional siloxane adsorbents, which results in higher methane recovery efficiencies. An anticipated benefit of reduced water adsorption will be higher methane recovery efficiencies associated with the process. Neutral adsorbents can be derived from many types of porous materials including, but not limited to aluminas, activated carbons, resin materials and zeolites. Examples of neutral adsorbents include zeolites such as MCM-41, de-aluminated zeolites, ZSM-5, zeolite Beta, and other materials such as neutralized activated carbons, neutralized silicas, polymeric resins, etc. It is also recognized that at low relatively humidities, neutralized active carbon qualifies as well. The neutral adsorbents minimize polymerization of siloxanes and other adsorbed compounds and are less prone to oxidize materials. As a consequence, the adsorbed species do not undergo a molecular change and are more readily desorbed during a high temperature regeneration step, restoring a significant portion of the original porosity of the adsorbent and leaving the regenerated bed free of residual organic and potentially flammable compounds.

The process of the present invention combines the physical properties of the adsorbent with the operating parameters for adsorption and desorption, to effectively remove siloxanes from natural gas streams, such as biogas, while extending bed life. The adsorption step of the novel process is operated at an elevated temperature sufficient to reduce the relative humidity of the process stream to less than 50% and minimize adsorption of additional vapor phase impurities, such as hydrocarbons, halogen-containing hydrocarbons, and sulfur gases. Operating at said process conditions will reduce the amount of pore volume occupied by water and other impurities, leaving increased capacity for the adsorption of siloxanes thoroughly, allowing for the use of smaller beds, and/or operating the TSA process with longer cycle times.

Typically, siloxane adsorption is conducted at low temperatures and low relative humidity. The neutral adsorbent allows for adsorption at higher temperatures, 100-200° F., preferably 100-125° F. in order to reduce humidity of the biogas, such that water is less strongly adsorbed than at lower temperatures and correspondingly higher RH values. This feature improves the capacity of the adsorbent for siloxane, prolongs its life and eliminates costly pretreatment such as dewatering. The result is a less complicated system that, in a single step, removes siloxane while allowing water and other contaminants like $H_2S$ to pass through.

To speed regeneration of the siloxane-filled adsorbent, the neutralized adsorbent is typically heated. The heating of the neutralized adsorbent can be accomplished using regeneration gas that is heated before coming into contact with the adsorbent. Such regeneration gas can vary widely and comprise air or a slipstream of the product gas, or mixtures thereof and has been described previously. Importantly, in accordance with this invention, the neutralized adsorbent can be heated to higher temperatures than previously used. Thus, the neutralized adsorbent, which has adsorbed the siloxanes from the landfill gas or the like, and contains the adsorbed siloxanes within its pores, can be heated to a temperature of greater than 50° F. above the incoming process gas. Temperatures greater than 250° F. are particularly useful, preferably at least 350° F., and more preferably 450° F. and higher. Since the adsorbent does not have an acid or basic surface, the elevated temperatures for regeneration do not increase the polymerization reactions, which take place with acid or basic activated sorbent surfaces.

A "gas mover", such as a blower, a compressor or a vacuum pump, can be used to move the regeneration gas through the bed of adsorbent. The blower and the compressor push the regeneration gas through the adsorbent. The vacuum pump pulls the regeneration gas through the adsorbent. In embodiments, two or more gas movers can be used to move the regeneration gas through the adsorbent.

Biogas from which siloxanes have been removed can be burned in various combustion engines without forming harmful silicon dioxide particles.

In general, two or more adsorbent beds are employed in the TSA process. The siloxane-laden feed gas enters the first bed and the siloxanes are removed via physical adsorption within the pores of the neutral adsorbent media, and a purified stream leaves the first bed as purified product gas. The neutral adsorbent minimizes reactions leading to polymerization of siloxanes, thereby preventing unwanted pore plugging. During operation of the first bed, the second bed is purged of siloxane and other adsorbed contaminants, such as for example hydrocarbons, water, sulfur gases, etc., which may be present in the siloxane-laden feed gas. Purge gas flowing at the desired flow rate and heated to the target temperature using a heater is passed through the second bed. The waste stream exits the top of the second bed. Depending on the composition, the waste stream may be merely vented to atmosphere. Alternatively, the waste stream may undergo further treatment, such as for example being delivered to a flare. Once the neutral adsorbent media in the first bed becomes saturated with siloxane, as evident by the presence of low concentrations of siloxanes in the purified product gas, the flow of siloxane-laden feed gas through the first bed is terminated and the flow of siloxane-laden feed gas is diverted to the second bed. The first bed is then regenerated by passing heated purge gas through the bed.

Having generally described the present invention, reference is now made to the following examples, which are provided for purposes of illustration only and are not intended to be limiting.

EXAMPLE 1

The purpose of this example is to illustrate the effects of surface acidity and surface alkalinity on polymerization reactions related to D4 siloxane. Coconut shell carbon as 12×30 mesh granules were ground into less than 200 mesh powder. Surface acidification was performed by slurrying approximately 10 g of the carbon powder in 100 ml of a boiling $HNO_3$ solution for 1 hour. The slurry was filtered, then washed with 250 ml DI water and dried at 110° C. for 1 hour. This treatment yields acidic oxygen sites on the carbon surface. This sample is referred to as "Acidic Carbon."

Coconut shell carbon was neutralized by slurrying approximately 10 g in 100 ml DI water and titrating from a pH of 10.6 to a pH=7 using a dilute $HNO_3$ solution. The resulting slurry was filtered, then dried at 110° C. for 1 hour. This treatment neutralizes basic oxygen sites associated with the coconut carbon. This sample is referred to as "Neutral Carbon."

The alkalinity/acidity of the carbon samples was measured by slurrying 1 g of carbon in 50 ml DI water and recording the slurry pH. The readings for the 3 carbon samples are presented in Table 1 below and demonstrate the difference in surface properties of each material:

TABLE 1

| Sample | pH Water | pH Slurry |
|---|---|---|
| As-Received, Basic Carbon | 7.23 | 10.17 |
| Acidic Carbon | 7.34 | 3.12 |
| Neutral Carbon | 7.19 | 7.23 |

The siloxane reactivity was evaluated by depositing 150 mg of each carbon into a 15 dram vial. To the carbon in the vial was added 75 mg of liquid D4 siloxane as about 5-8 μl droplets. The contents of the vial were mixed using a spatula. The vial was capped and placed in a water bath at 77° F. for 4 hours. Following 4 hours, the vial was removed from the water bath. To the vial was added 10 ml of methanol. The vial was agitated for 15 minutes on a wrist shaker for the purpose of extracting any unreacted siloxane from the pores of the carbon. The solution was then evaluated for residual D4 siloxane using a gas chromatograph. Table 2 below reports the conversion of D4 siloxane achieved for each sample. While not wishing to be limited to any particular theory, we believe D4 siloxane was primarily converted to polymerization products. Conversion of D4 siloxane was computed by subtracting from 100% the amount of D4 siloxane in solution divided by the amount of D4 siloxane added to the sample, times 100%.

TABLE 2

| Sample | D4 Conversion |
|---|---|
| As-Received, Basic Carbon | 42% |
| Acidic Carbon | 98% |
| Neutral Carbon | 6% |

The presence of reaction products associated with the Acidic Carbon was assessed using XPS spectroscopy. A significant amount of silica was detected upon XPS analysis of the acidic carbon. The position of the silicon 2p photoelectron peak was at 101.7 eV, indicative of polymerized siloxane. This result confirms the postulated polymerization reactions.

Results demonstrate that both acidic and basic carbons will facilitate the polymerization of D4 siloxane, while these reactions are greatly minimized upon contact with the neutralized carbon.

EXAMPLE 2

The purpose of this example is to illustrate the ability of a Neutral Surface Media to desorb siloxanes. 12×30 mesh coconut carbon was neutralized as described previously in Example 1. 14 cm³ of Neutral Surface Media granules were loaded into a 3 cm diameter test cell and exposed to 125 ppm D4 siloxane in humid air (5.5% $H_2O$) at 140° F. and a residence time of 0.23 seconds. The surface area of the carbon granules was 1,650 m²/g. The effluent concentration of siloxane was monitored continuously using a gas chromatograph throughout the duration of the run. The feed was terminated following 21 hours, at which time, the effluent concentration of D4 siloxane was consistent with that of the feed. The bed was then heated to 500° F. in 2 hours (rate=180° F./hr) under flowing, humid air, with the final temperature maintained for an additional 18 hours. Nearly 90% of the adsorbed D4 siloxane was desorbed during regeneration of the bed, illustrating the effective removal of siloxane from a Neutral Surface Media.

EXAMPLE 3 (Comparative)

The purpose of this example is to illustrate the ability of an Acidic Carbon to retain siloxanes. 12×30 mesh coconut carbon was acidified as described previously in Example 1. 14 cm³ of Acidic Carbon granules were loaded into a 3 cm diameter test cell and exposed to 125 ppm D4 siloxane in humid air (5.5% $H_2O$) at 140° F. and a residence time of 0.23 seconds. The surface area of the carbon granules was 1,600 m²/g. The effluent concentration of siloxane was monitored continuously using a gas chromatograph throughout the duration of the run. The feed was terminated following 23 hours, at which time, the effluent concentration of D4 siloxane was consistent with that of the feed. The bed was then heated to 500° F. in 2 hours (rate=180° F./hr) under flowing, humid air, with the final temperature maintained for an additional 15 hours. Approximately 26% of the D4 siloxane was desorbed from the media during regeneration of the bed. This result indicates that siloxanes are not effectively removed from the acidified carbon.

EXAMPLE 4

A pilot scale temperature swing adsorption system (TSA) was constructed and installed at a landfill gas test site. The process consisted of two vessels each containing approximately 3.7 liters of adsorption media. The media consisted of neutralized activated carbon as 4 mm diameter extrudates (surface area=1,100 m²/g). 1 g of media slurried in DI water yielded a pH value of 7.82. The TSA was operated with a nominal inlet temperature of 105° F. and a nominal bed regeneration temperature of 525° F. The adsorption time was varied between 8 and 14 hours. The regeneration step consisted of heating to 525° F. in 1 hour, maintaining this temperature for 5.5 hours, then cooling the bed to 105° F. in 3.5 hours. The feed flow rate was 3 Nft³/min. Nft³ refers to normal cubic foot, which is defined as one ft³ of gas at 1 atmosphere pressure and 77° F. Product gas was used to purge the bed at a flow rate of 1 Nft³/min. The process stream was comprised of nominally 10-15 ppm D4 siloxane and 4-6 ppm of D5 siloxane, plus 300-500 ppm $H_2S$ and 5% $H_2O$. The process was operated continuously for 72 days. At discrete times, the feed and effluent concentration of siloxanes was monitored. At no time during the operation did the effluent concentration of exceed 0.025 ppm of either D4 or D5 siloxane.

The invention claimed is:

1. A process for removing siloxanes from a natural gas feed comprising:
    passing the natural gas feed through an adsorbent bed comprising an adsorbent having a neutral surface to adsorb onto the adsorbent at least a portion of the siloxanes in the natural gas feed; and
    regenerating the adsorbent by removing the siloxanes adsorbed on the adsorbent.
2. The process of claim 1, wherein said regenerating comprises heating the adsorbent.
3. The process of claim 1, wherein said natural gas feed is a biogas.
4. The process of claim 1, wherein said adsorbent produces a pH of between 5 and 9, when slurried in water.
5. The process of claim 4, wherein said adsorbent produces a pH of between 6 and 8, when slurried in water.
6. The process of claim 2, wherein said adsorbent is heated to a temperature of greater than 250° F.
7. The process of claim 6, wherein said adsorbent is heated to a temperature of at least 350° F.
8. The process of claim 7, wherein said adsorbent is heated to a temperature of at least 450° F.
9. The process of claim 1, wherein said adsorbent is obtained by neutralizing an acidic or basic adsorbent.
10. The process of claim 9, wherein said adsorbent is activated carbon.
11. The process of claim 1, wherein said natural gas feed is at a temperature of 100-125° F. when passed through said adsorbent bed.
12. The process of claim 3, wherein said biogas further includes water, VOC's, hydrogen sulfide or mixtures thereof.
13. The process of claim 11, wherein said biogas is obtained from a landfill, digester or sewage treatment plant.
14. The process of claim 3, wherein said biogas being passed through the adsorbent bed has a relative humidity of less than 50%.
15. The process of claim 3, wherein said adsorbent produces a pH of between 5 and 9, when slurried in water.
16. The process of claim 3, wherein said regenerating comprises heating said adsorbent to a temperature of greater than 250° F.
17. The process of claim 16, wherein said adsorbent is heated to a temperature of at least 350° F.
18. The process of claim 17, wherein said adsorbent is heated to a temperature of at least 450° F.
19. The process of claim 3, wherein said adsorbent is obtained by neutralizing an acidic or basic adsorbent.
20. The process of claim 19, wherein said adsorbent is activated carbon.

* * * * *